US012398470B2

(12) United States Patent
Song et al.

(10) Patent No.: US 12,398,470 B2
(45) Date of Patent: Aug. 26, 2025

(54) METAL MATERIAL FOR STORAGE CONTAINER OF HIGH-PURITY HYDROGEN FLUORIDE WITH IMPROVED SCRATCH RESISTANCE AND METHOD FOR MANUFACTURING SAME

(71) Applicant: SK SPECIALTY CO., LTD., Yeongju-si (KR)

(72) Inventors: Young-Ha Song, Cheonan-si (KR); Young-Bom Kim, Suwon-si (KR)

(73) Assignee: SK SPECIALTY CO., LTD., Yeongju-si (KR)

( * ) Notice: Subject to any disclaimer, the term of this patent is extended or adjusted under 35 U.S.C. 154(b) by 0 days.

(21) Appl. No.: 18/268,291

(22) PCT Filed: Apr. 20, 2021

(86) PCT No.: PCT/KR2021/004964

§ 371 (c)(1),
(2) Date: Jun. 19, 2023

(87) PCT Pub. No.: WO2022/139074

PCT Pub. Date: Jun. 30, 2022

(65) Prior Publication Data

US 2024/0052494 A1 Feb. 15, 2024

(30) Foreign Application Priority Data

Dec. 21, 2020 (KR) ........................ 10-2020-0179187

(51) Int. Cl.
*C23C 28/00* (2006.01)
*F17C 1/10* (2006.01)

(52) U.S. Cl.
CPC .............. *C23C 28/32* (2013.01); *C23C 28/34* (2013.01); *F17C 1/10* (2013.01);
(Continued)

(58) Field of Classification Search
CPC ................................ C23C 28/34; C23C 28/32
See application file for complete search history.

(56) References Cited

U.S. PATENT DOCUMENTS 6,280,597 B1 8/2001 Kashiwada et al.
6,692,869 B1 * 2/2004 Ohmura ................ H01M 50/56 428/681
2020/0399760 A1 * 12/2020 Faichuk .................. C23C 18/34

FOREIGN PATENT DOCUMENTS

JP H05302177 A 11/1993
JP 2004149927 A * 5/2004
(Continued)

OTHER PUBLICATIONS

International search report of PCT/KR2021/004964, Sep. 17, 2021, English translation.

*Primary Examiner* — Kelly M Gambetta
(74) *Attorney, Agent, or Firm* — STIP Law Group, LLC

(57) ABSTRACT

The present disclosure relates to a metal material for a container for storing high-purity hydrogen fluoride, and to a manufacturing method therefor. Specifically, the disclosure relates to a metal material for a container for storing high-purity hydrogen fluoride, and a manufacturing method therefor. The metal material includes a graphite layer on the surface of a metal substance, and nickel fluoride films formed in structural defect spaces within the graphite layer, so that corrosion resistance and scratch resistance are improved, and thus high-purity hydrogen fluoride, which is a corrosive gas, can be stored and transferred without being contaminated.

4 Claims, 2 Drawing Sheets

(52) U.S. Cl.
CPC ................. *F17C 2203/0607* (2013.01); *F17C 2203/0648* (2013.01); *F17C 2260/011* (2013.01); *F17C 2260/053* (2013.01)

(56) References Cited

FOREIGN PATENT DOCUMENTS

| | | | | |
|---|---|---|---|---|
| JP | 3891815 | B2 | | 3/2007 |
| JP | 2007197766 | A | * | 8/2007 |
| KR | 100308688 | B1 | | 11/2001 |
| KR | 100591502 | B1 | | 6/2006 |
| KR | 20130041438 | A | | 4/2013 |
| KR | 101745573 | B1 | | 6/2017 |

* cited by examiner

METAL MATERIAL FOR STORAGE CONTAINER OF HIGH-PURITY HYDROGEN FLUORIDE WITH IMPROVED SCRATCH RESISTANCE AND METHOD FOR MANUFACTURING SAME

CROSS-REFERENCE TO RELATED APPLICATIONS

This application is the U.S. National Phase under 35 U.S.C. § 371 of International Application No. PCT/KR2021/004964, filed on Apr. 20, 2021, which in turn claims the benefit of Korean Application No. 10-2020-0179187, filed on Dec. 21, 2020, the disclosures of which are incorporated by reference into the present application.

TECHNICAL FIELD

The present disclosure relates to a metal material for a storage container for high-purity hydrogen fluoride with improved scratch resistance. The present disclosure relates to a material for a container for storing high-purity hydrogen fluoride and a method for manufacturing the same, which improves corrosion resistance as well as scratch resistance so that hydrogen fluoride, which is a corrosive gas, can be stored and transported in high-purity for a long time without contamination.

BACKGROUND ART

Nearly 150 types of gases are used in the manufacturing process of semiconductor devices, microelectromechanical systems (MEMS) devices, thin film transistor (TFT) panels for liquid crystals, and solar panels, depending on the process characteristics such as etching, film deposition, and cleaning.

For example, in the manufacturing process of semiconductors, highly reactive and corrosive specialty halogen-based gases such as hydrogen chloride (HCl), boron trichloride ($BCl_3$), fluorine ($F_2$), nitrogen trifluoride ($NF_3$), chlorine trifluoride ($ClF_3$), hydrogen bromide (HBr), and hydrogen fluoride (HF) are used. In particular, hydrogen fluoride (HF) is used as a highly active corrosive gas in the etching gas and cleaning process, and the characteristics of the semiconductor process, which is increasingly direct, require increasingly high purity and ultra-high purity gases to minimize the defect rate.

However, hydrogen fluoride is a highly active corrosive gas that is easily hydrolyzed by moisture in the air and corrodes the metal materials and metal film structures that make up storage containers, valves, pipes, reaction chambers, etc., which handle hydrogen fluoride. Due to this corrosion, the stored and supplied hydrogen fluoride becomes contaminated and less pure and cannot be used in semiconductor processes.

To solve this problem, highly corrosion resistant device materials have been developed that can handle hydrogen fluoride.

For example, Japanese Patent No. 3891815 (Mar. 14, 2007) discloses an aluminum alloy for film-forming treatment, which is an alloy with excellent corrosion resistance, containing 4.0% to 5.0% by weight of Mg and 0.02% to 0.1% by weight of Cr, and in which the respective contents of Si, Fe, Cu, Mn, Zn, and Ni as impurities are regulated to be less than or equal to 0.1% by weight each, and the remainder is composed of Al and other impurities, and discloses that the alloy and the alloy material are suitable as materials for semiconductor manufacturing devices. However, in the case of the previous literature, there is a problem in that it is difficult to maintain corrosion resistance when limited to aluminum alloys, manufacturing and refining processes to have such a composition are complex, and scratches are formed by external stimuli.

In addition, Hastelloy, which is a nickel alloy with very strong corrosion resistance, and Inconel, which is a nickel-based alloy with 15% chromium and excellent heat and corrosion resistance, can be considered as device materials for handling hydrogen fluoride, but these alloys are expensive and have poor machinability, thereby reducing the economy and process efficiency.

Therefore, nickel metal surfaces are generally developed to exhibit very high corrosion resistance to corrosive gases, including hydrogen fluoride, by passivating the nickel metal surface using fluorine gas.

However, since such a passivation layer using fluorine is not too thick and is vulnerable to scratches, Korean Registered Patent No. 10-0308688 (Nov. 30, 2001) discloses the formation of a thick passivation layer by forcibly oxidizing the surface of a metal material made of nickel or a nickel alloy or a nickel or nickel alloy film, and then passivating the forced oxidation layer using fluorine or the like to form a fluorinated layer of 1 μm or more on the surface, thereby improving corrosion resistance. However, in the case of the above previous art, since the surface of the nickel or nickel alloy film is forced to be oxidized, and the fluorinated layer is required to form a substantial thickness of 1 μm or more, the process is complicated, the adhesion of the fluorinated layer to the base material is reduced, and it is difficult to improve the wear resistance and durability of the fluorinated layer to a satisfactory level and maintain it for a substantial period of time.

The present disclosure was designed to solve the above problems, and the present disclosure was completed by discovering that forming a graphite layer with excellent scratch resistance on the inner surface of the storage container as the outermost layer but forming a nickel fluoride layer on defects such as holes that may occur in the graphite layer, improves scratch resistance in addition to long-term corrosion resistance, enabling long-term storage of hydrogen fluoride, etc.

PATENT LITERATURE (Patent Literature 1) Japanese Patent No. 3891815 (issue date: 2007 Mar. 14)

(Patent Literature 2) Korean Patent No. 10-0308688 (published date: 2001 Nov. 30)

DISCLOSURE

Technical Problem

An objective of the present disclosure is to provide a metal material for a container for storing high-purity hydrogen fluoride, which is capable of storing and transporting hydrogen fluoride in high purity due to improved corrosion resistance and scratch resistance, even when fluorination treatment of the outermost surface layer does not form a substantial thickness of the fluorinated layer.

Another objective of the present disclosure is to provide a container for storing high-purity hydrogen fluoride made of metal material for the container.

Still another objective of the present disclosure is to provide a method for manufacturing a metal material for a storage container of high-purity hydrogen fluoride.

Technical Solution

In order to solve the above problems, the present disclosure provides a container for storing high-purity hydrogen fluoride, the metal material includes; a nickel plating layer formed on the surface of the substrate; a graphite layer formed on the surface of the nickel plating layer; and a nickel fluoride film formed in a structural defect space in the graphite layer.

In one embodiment of the present disclosure, the graphite layer may have a thickness in a range of 2 to 100 μm.

In addition, the present disclosure provides a method for manufacturing a metal material for a storage container of high-purity hydrogen fluoride, the method includes: (1) forming a nickel plating layer on a metal substrate; (2) forming a graphite layer on the surface of the nickel plating layer; (3) plating nickel again on the upper portion of the graphite layer so that the nickel is inserted into the structural defect space in the graphite layer, and removing the nickel plated film formed on the upper portion of the graphite layer; and (4) forming a graphite layer containing nickel fluoride by fluorinating the nickel inserted into the structural defect space in the graphite layer, where the step (3) is completed.

The graphite layer may have a thickness in a range of 2 to 100 μm.

In addition, the graphite layer in the step (2) may be formed by reacting the carbon source reaction gas with the surface of the nickel plating layer.

In one embodiment of the present disclosure, the fluorination treatment in the step (4) may be performed using at least one gas selected from the group consisting of fluorine ($F_2$), hydrogen fluoride (HF), chlorine trifluoride ($ClF_3$), nitrogen fluoride ($NF_3$), and methane fluoride ($CH_3F$), or a gas obtained by diluting this gas with an inert gas.

In addition, the present disclosure provides a container for storing high-purity hydrogen fluoride made of the above metal material.

Advantageous Effects

The container material of the present disclosure forms a coating film in multiple layers on a substrate and forms a graphite layer as the outermost surface layer, but forms a nickel fluoride film in the holes that may be generated in the graphite layer to reinforce the density of the graphite layer. As a result, the scratch resistance of the graphite layer significantly reduces the possibility of damage to the coating, such as pinholes and cracks that may occur due to external environment and impact, and thus has the advantage of maintaining sufficient corrosion resistance for a long time without forming a substantial thickness of the nickel fluoride layer, which is a passivation film.

MODE FOR INVENTION

Unless defined otherwise, all technical and scientific terms used herein have the same meaning as commonly understood by those of ordinary skilled in the art to which this disclosure belongs. In general, the nomenclature used herein is well-known and commonly used in the art.

When a part of the present specification "includes" a component throughout the present specification, this means that it may further include other components rather than excluding the other component unless otherwise opposed.

In the entire specification, the term "structural defect space of the graphite layer" refers to spaces such as pinholes and cracks that may occur as the graphite layer is formed.

Hereinafter, the present disclosure will be described in more detail.

The present disclosure provides a metal material for a container for storing high-purity hydrogen fluoride, the metal material includes: a metal substrate; a nickel-plated layer formed on a surface of the substrate; a graphite layer formed on a surface of the nickel-plated layer; and a nickel fluoride layer formed in a hole of the graphite layer.

Figure 1:
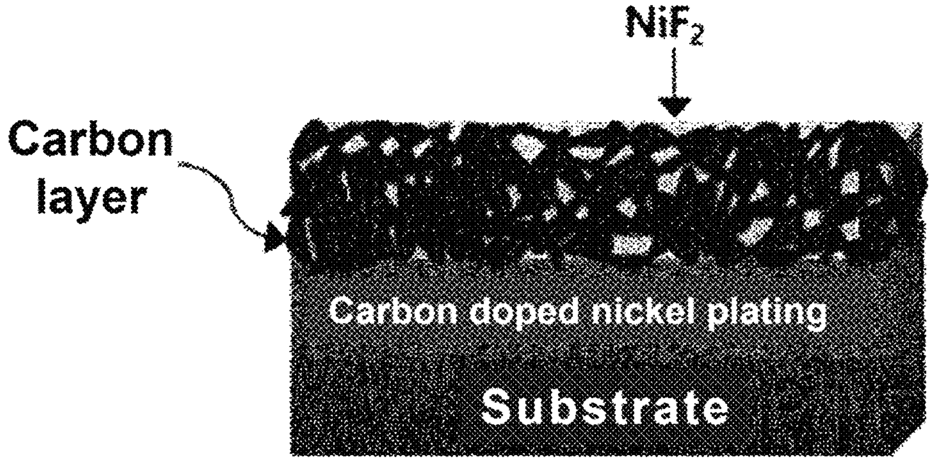
FIG. 1 shows a container material for storing high-purity hydrogen fluoride according to the present disclosure.

FIG. 1 shows a metal material for a container for storing high-purity hydrogen fluoride according to the present disclosure, which will be further described with reference to the following.

Referring to FIG. 1, the metal material for a container of the present disclosure forms a nickel plating layer on the surface of a metal substrate.

The metal substrate is not particularly limited as long as the metal substrate is stable and dense enough to be used as a container, but may be any one of aluminum, aluminum alloys, nickel, nickel alloys, stainless steel, and preferably stainless steel, and the thickness of the metal substrate may be in a range consistent with the gas stability criteria.

The nickel plating layer formed on the surface of the metal substrate may be formed by electroplating or non-electroplating, in which the nickel may be pure Ni, or may be Ni—P, Ni—B, Ni—C doped with P, B, C, etc.

The thickness of the nickel plating layer may be formed in the range of 5 to 60 μm. When the thickness of the nickel plating layer is less than 5 μm, it is not possible to form irregularities to improve adhesion with the graphite layer described later, and when the thickness exceeds 60 μm, the nickel film may be uneconomical due to excessive thickness. Preferably, the thickness of the nickel plating layer is in a range of 30 to 40 μm.

Additionally, P, B, C, and the like doped in nickel may be included in amounts from 0.01 to 5 parts by weight per 100 parts by weight of nickel.

Since the nickel plating layer is plated to form a graphite layer to be described later, it is more preferable that the nickel plating layer has some surface roughness. The surface roughness refers to the degree of microscopic irregularities that occur on the surface when the metal surface is processed to refine and is caused by the tool used for processing, the suitability of the processing method, scratches on the surface, rust, and the like. According to KS B 0161, the surface roughness can be defined as a maximum height (Rmax), a ten-point average roughness (Rz), and a centerline average roughness (Ra), and such surface roughness can affect the physical and chemical properties of the contact part, in the present disclosure, the centerline average roughness (Ra) of the metal substrate may be in the range of 0.5 to 3 μm, and preferably in the range of 1.0 to 2.0 μm. When the average roughness (Ra) of the surface of the nickel plating layer is within the above range, adhesion between the graphite layer and the nickel plating layer described later may be maximized.

The nickel or the like is a metal that exhibits activity in dehydrogenation and the like, and when contacted with unsaturated hydrocarbons such as ethylene, acetylene, and the like at high temperatures, hydrogen can be removed from the carbides, and carbon can be deposited.

The graphite layer formed on the surface of the nickel plating layer is formed with high adhesion to the nickel plating layer, and considering the corrosion resistance and the durability of the film due to the density of the film, when formed with a thickness in the range of 2 to 100 μm, preferably 5 to 50 μm, the loss of the film due to external impact can be prevented. When the thickness of the graphite layer is 5 μm or less, the scratch resistance may be poor, and when the thickness is 100 μm or more, the adhesion to the nickel plating layer may be deteriorated.

The graphite layer is likely to contain structural defects (voids) space due to the unintentional formation of holes and other voids in the graphite layer due to the characteristics of the material, and therefore, when the graphite layer alone is formed as the outermost surface layer due to its low density, HF, etc., may penetrate into the holes of the graphite layer and cause corrosion of the inner layer, thus not being suitable as a container material for storing and transporting fluoride gas, which is a corrosive gas.

Therefore, the present disclosure makes the graphite layer as the outermost surface layer to have scratch resistance, but in order to solve the corrosion problem caused by the structural defect of the graphite layer and further improve the corrosion resistance, the nickel plating is once again applied to the surface of the graphite layer. Due to this nickel plating, the structural defects of the graphite layer can be eliminated by allowing the nickel plating layer to penetrate into the structural defects space, such as holes, and fill the holes in the graphite layer.

Thereafter, the nickel plating layer formed on the outermost layer is then removed by etching or polishing so that at least the graphite layer appears on the outermost surface. As a result of this process, most of the outermost surface is made up of a graphite layer, but holes, etc., existing on the surface of the graphite layer are blocked by the nickel plating layer.

When the above surface is fluorinated in this state, the nickel plating layer present in the holes of the graphite layer is passivated, and a nickel fluoride layer is formed, thereby eliminating structural defects in the graphite layer and improving the density of the graphite layer, as well as exhibiting improved scratch resistance despite the fact that the thickness of the nickel fluoride film is thinner than that generally required for improved corrosion resistance, and increasing durability and service life, etc.

In general, when defects such as cracks and pinholes are generated in the passivation layer, nickel fluoride or fluoride layer by the external environment, corrosive gases, oxygen, moisture, etc., are migrated between the defects and cause corrosion of the substrate, so the passivation layer should be formed to a considerable thickness to prevent the migration of corrosion-causing substances to the substrate.

However, since the nickel fluoride layer of the present disclosure is formed in a structural defect space such as a hole in the graphite layer, the thickness of the nickel fluoride layer does not become a major factor for mechanical strength such as durability of the nickel fluoride layer, as no physical stimuli of the external environment are directly applied to the nickel fluoride layer, but rather, the scratch resistance of the graphite layer prevents direct external environmental stimuli from being applied to the nickel fluoride layer, so that the occurrence of defects such as cracks and pinholes due to external stimuli such as scratches is significantly reduced.

As such, the container material of the present disclosure has a multi-layer coating on the substrate and a graphite layer including a nickel fluoride film as the outermost surface layer, which significantly reduces the possibility of damage to the coating, such as pinholes and cracks, which can be caused by the external environment and impact, and enables corrosion resistance to be maintained for a long time. Therefore, the container material can be applied to storage containers for highly corrosive hydrogen fluoride, and storage containers for hydrogen fluoride, etc., which are made of the metal material of the present disclosure, and have excellent long-term durability compared to storage containers made of other materials.

In addition, the present disclosure provides a method for manufacturing a metal material for a storage container of high-purity hydrogen fluoride, the method includes: (1) forming a nickel plating layer on a metal substrate; (2) forming a graphite layer on the surface of the nickel plating layer; (3) plating nickel again on the upper portion of the graphite layer so that the nickel is inserted into the structural defect space in the graphite layer, and removing the nickel plated film formed on the upper portion of the graphite layer; and (4) forming a graphite layer containing nickel fluoride by fluorinating the nickel inserted into the structural defect space in the graphite layer, where the step (3) is completed.

Figure 2:
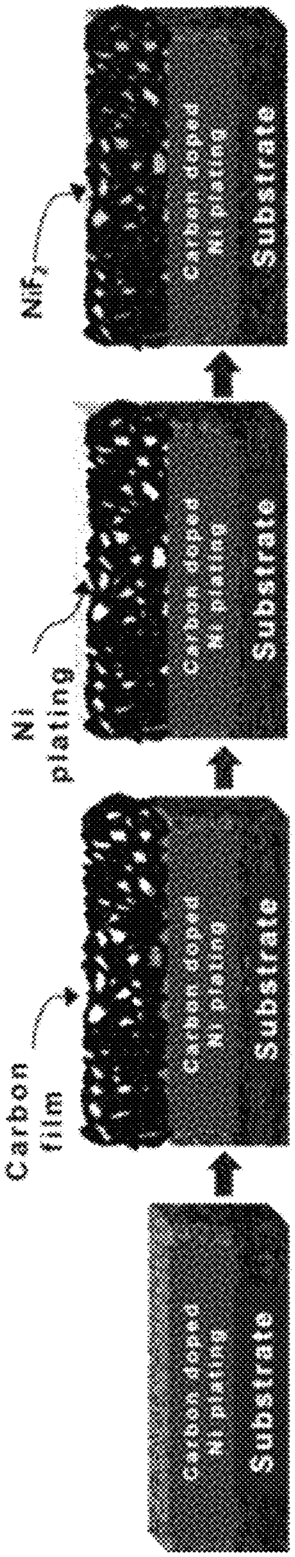
FIG. 2 is a process diagram illustrating a method of manufacturing a container material according to the present disclosure.

FIG. 2 is a process diagram showing a method for manufacturing a metal material for a container according to the present disclosure, which will be described with reference to this.

Referring to FIG. 2, the step (1) is forming a nickel plating layer on a metal substrate, in which the surface of the substrate is pretreated to remove surface impurities, and then the nickel is electrolytically or electroless plated.

The pretreatment of the metal substrate is intended to remove impurities present on the surface of the metal substrate to improve the adhesion of the substrate to the plating film formed on the substrate and to prevent the formation of an unnecessary oxidizing atmosphere. This pretreatment may be performed by conventional pretreatment methods such as chemical cleaning, commercial degreasing, dry etching, etc., in which the metal substrate is not particularly limited as long as it is stable and dense enough to be used as a container but may be any one of aluminum, aluminum alloy, nickel, nickel alloy, stainless steel, and preferably stainless steel, and the thickness of the metal substrate is in a range that satisfies gas stability standards.

The thickness and surface roughness of the nickel plating layer may be as described above.

In the present disclosure, the step (2) is forming a graphite layer on the surface of the nickel plating layer, and the graphite layer is formed to have a thickness in a range of 2 to 100 μm, preferably 5 to 50 μm.

The formation of the graphite layer can be achieved by applying an aqueous solution dispersed in the carbon material to the surface and drying it or by pressing the carbon material directly to the surface, but the graphite layer can be formed more efficiently by utilizing the dehydrogenation property of nickel. That is, a graphite layer may be formed by raising the temperature while supplying a carbon source reaction gas to the nickel plating layer to deposit carbon on the nickel plating layer and then graphitizing the carbon by raising the temperature to a higher temperature. At this time, the surface roughness of the nickel plating film may be artificially increased for carbon deposition efficiency.

At this time, the temperature at which the graphite layer is formed may be in the range of 500° C. to 1000° C., preferably in the range of 600° C. to 800° C. The carbon source reaction gas, which may include an aliphatic hydrocarbon molecule in a gas phase including at least one selected from acetylene, ethylene, ethane, propane, and methane, or an aromatic hydrocarbon molecule in a gas phase including at least one selected from benzene, naphthalene, anthracene, phenanthrene, and pyrene, and which reacts with the nickel surface to form a graphite layer. Further, the carbon source reactant gas is preferably supplied at 0.1 to 50 vol % in the inert carrier gas.

In the present disclosure, the step (3) is forming a nickel plating film on the formed graphite layer, in which sufficient nickel is plated on the top of the graphite layer so that nickel is inserted and plated into structural defect spaces such as holes in the graphite layer, and then removing the nickel plating film formed on the top of the graphite layer.

In the step (3) above, the structural defect space in the graphite layer is filled with nickel plating to improve the density of the graphite layer, and the nickel plating film formed on the top of the graphite layer is removed by electrolytic polishing or etching to make the graphite layer be the top surface layer, thereby improving scratch resistance.

In the present disclosure, the step (4) is forming a graphite layer including nickel fluoride by fluorinating the nickel inserted in the structural defect space in the graphite layer in which the step (3) above is completed, and the fluorinating treatment may be performed by a general method, but is not limited thereto, and the temperature at the time of fluorinating is 200° C. to 500° C. to improve the efficiency of producing nickel fluoride and corrosion resistance.

The fluorinated gas used in the above fluorination reaction may be at least one gas selected from the group consisting of fluorine ($F_2$), hydrogen fluoride (HF), chlorine trifluoride ($ClF_3$), nitrogen fluoride ($NF_3$), methane fluoride ($CH_3F$), or a gas obtained by diluting this gas with an inert gas.

As the dilution gas, an inert gas such as nitrogen or helium can be used, and nitrogen is preferable. When the fluorinated gas is diluted and used, its concentration can be set in an appropriate amount depending on the reaction conditions. For example, in the case of fluorine, a concentration of 10% is recommended for cost reasons and the like.

Hereinafter, examples will be described for more specific explanation of the present disclosure. However, the following embodiments are preferred embodiments of the disclosure, and the disclosure is not limited to the following embodiments.

EXAMPLE

Manufacture of Hydrogen Fluoride Storage Containers

Example 1

A commercially available high-pressure vessel made of stainless steel (316L, thickness 5 mm) was used as the metal substrate, and pretreatment of the metal substrate was first performed. The surface of the material was cleaned by degreasing with alkali and ethanol and then washed again with high-purity DI water. Hot $N_2$ was used for drying to complete the pretreatment. The above metals were placed in the reaction chamber, Ar gas was injected into the chamber at 45 sccm, and a voltage of 1100 V and a current of 0.2 A were applied to the ion gun to etch the metals.

The surface of the pretreated metal substrate was electroless plated using an aqueous solution containing graphite, nickel sulfate ($NiSO_2$) metal salt, and sodium hypophosphite ($NaH_2PO_2$) reducing agent to form a carbon-doped Ni plating layer with a thickness of 10 μm on the surface of the metal substrate. Then, the surface roughness (Ra) of the Ni plating layer was set to 1 μm.

Thereafter, the Ni plating layer was then heated to 500° C. while supplying acetylene to the Ni plating layer to deposit carbon on the surface of the carbon-doped Ni plating film and then further heated to 800° C. to graphitize the deposited carbon to form a 10 μm thick graphite layer.

The graphite layer prepared above was electroless plated using an aqueous solution containing a metal salt of nickel sulfate (NiSO2) and a reducing agent of sodium hypophosphite (NaH2PO2), and Ni plating was applied to the upper surface of the graphite layer including the voids in the graphite layer, and the Ni plating film formed on the surface of the graphite layer was removed to reveal the graphite layer as the uppermost surface layer.

Finally, the outermost layer was fluorinated with a mixed gas consisting of 10% $F_2$ and residual Ar at 300° C. for 5 hours to produce a container material with a graphite layer as the outermost layer and a $NiF_2$ film formed in the voids in the graphite layer.

Comparative Example 1

After forming nickel plating on the upper portion of the graphite layer in Example 1, the container material was prepared by the same method as in Example 1 above, except that the fluorination treatment ($F_2$) was performed immediately without removing the nickel plating film on the upper portion of the graphite layer, forming a 200 nm thick $NiF_2$ film on the surface of the graphite layer, and the graphite layer was made to contain empty spaces.

Comparative Example 2

A container material was prepared in the same manner as in Example 1, except that the nickel layer and the fluorination treatment process were omitted.

Comparative Example 3

A container material was prepared in the same manner as in Example 1, except that a 200 nm thick $NiF_2$ film was formed on the surface of the Ni plating layer by omitting the graphite layer formation process.

Corrosion Resistance and Scratch Resistance Test

For each of the above-mentioned Example 1 and Comparative Examples 1 to 3, corrosion resistance and scratch resistance tests were performed in the following manner and are shown in Table 1 below.

Corrosion resistance test: After putting the container material specimen in a sealed container, HF was supplied to the container to create an HF atmosphere in the container and then left for 30 days, and the surface of the specimen was observed with an electron microscope.

Scratch resistance test: The prepared container material specimen was subjected to a scratch test using a scratch tester having a diamond tip.

TABLE 1

| | | Nickel fluoride film | | | | |
|---|---|---|---|---|---|---|
| | Graphite layer | In the graphite layer | Surface of the graphite layer | Nickel layer | Corrosion resistance | Scratch resistance |
| Example 1 1 | √ | √ | | | ◎ | ◎ |
| Comparative Example 1 | √ | | √ | | Δ | x |
| Comparative Example 2 | √ | — | — | — | x | ○ |
| Comparative Example 3 | — | — | — | √ | Δ | x |

(◎: very good, ○: excellent, Δ: normal, x: very bad)

According to Table 1, when a nickel fluoride film is formed in the empty space of the graphite layer (Example 1), both corrosion resistance and scratch resistance are excellent.

On the other hand, when a nickel fluoride film is formed on the surface of the graphite layer (Comparative Example 1) and when the graphite layer is omitted (Comparative Example 3), defects such as pinholes and cracks are easily generated in the coated film due to pressure and stimulation by the external environment, resulting in a significant decrease in corrosion resistance.

In addition, when the nickel fluoride film is not formed (Comparative Example 2), the scratch resistance is shown, but the corrosion resistance is weak.

While the present disclosure has been described with reference to exemplary embodiments illustrated in the accompanying drawings, those skilled in the art will appreciate that the exemplary embodiments are presented only for illustrative purposes. On the contrary, it will be understood that various modifications and equivalents to the exemplary embodiments are possible. Accordingly, the technical protection scope of the present disclosure should be defined by the following claims.

INDUSTRIAL APPLICABILITY

The present disclosure relates to a metal material for a storage container for storing high-purity hydrogen fluoride with improved corrosion resistance as well as scratch resistance, which enables storage and transportation of hydrogen fluoride, which is a corrosive gas, in high-purity for a long time without contamination, and a method for manufacturing the same. The present disclosure can be applied and utilized in various industries, such as semiconductor devices, MEMS devices, TFT panels for liquid crystals, and solar panels where high-purity hydrogen fluoride is applied.

The invention claimed is:

1. A method of manufacturing a metal material for a storage container for high-purity hydrogen fluoride, the method comprising:

(1) forming a nickel plating layer on a metal substrate;

(2) forming a graphite layer on the surface of the nickel plating layer;

(3) plating an upper portion of the graphite layer with nickel to form a nickel film so that the nickel is inserted into structural defect spaces in the graphite layer, and then removing the nickel film formed on the upper portion of the graphite layer; and (4) forming a graphite layer containing nickel fluoride by fluorinating the nickel inserted into the structural defect space in the graphite layer after the step (3) is completed.

2. The method of claim 1, wherein the graphite layer has a thickness in a range of 2 to 100 μm.

3. The method of claim 1, wherein the graphite layer in the step (2) is formed by reacting a carbon source reaction gas with the surface of the nickel plating layer.

4. The method of claim 1, wherein the fluorinating of the step (4) is performed using at least one gas selected from the group consisting of fluorine ($F_2$), hydrogen fluoride (HF), chlorine trifluoride ($ClF_3$), nitrogen fluoride ($NF_3$), and methane fluoride ($CH_3F$), or a gas obtained by diluting the selected gas with an inert gas.

* * * * *